United States Patent [19]
Lupien

[11] Patent Number: 6,125,276
[45] Date of Patent: Sep. 26, 2000

[54] INTER-EXCHANGE SIGNALING FOR IN-CALL SERVICE CHANGE REQUESTS

[75] Inventor: Francis Lupien, Montreal, Canada

[73] Assignee: Telefonaktiebolaget LM Ericsson (publ), Stockholm, Sweden

[21] Appl. No.: 08/706,727

[22] Filed: Sep. 6, 1996

[51] Int. Cl.[7] .............................. H04Q 7/20; H04Q 7/00
[52] U.S. Cl. ..................... 455/436; 455/423; 455/432; 455/441; 455/442; 370/331; 370/337
[58] Field of Search .................................... 455/436, 557, 455/433, 412, 414, 444, 441, 442, 423; 370/331, 337

[56] References Cited

U.S. PATENT DOCUMENTS

| | | | |
|---|---|---|---|
| 4,837,800 | 6/1989 | Freeburg et al. | 379/59 |
| 5,210,787 | 5/1993 | Hayes et al. . | |
| 5,278,890 | 1/1994 | Beeson, Jr. et al. . | |
| 5,396,543 | 3/1995 | Beeson et al. . | |
| 5,434,853 | 7/1995 | Hemmady et al. | 370/331 |
| 5,450,472 | 9/1995 | Brax | 379/58 |
| 5,483,531 | 1/1996 | Jouin et al. | 370/79 |
| 5,487,175 | 1/1996 | Bayley et al. | 455/54.2 |
| 5,566,356 | 10/1996 | Taketsugu | 455/436 |
| 5,577,103 | 11/1996 | Foti . | |
| 5,623,535 | 4/1997 | Leung et al. | 455/444 |
| 5,682,380 | 10/1997 | Park et al. | 370/331 |
| 5,711,002 | 1/1998 | Foti . | |
| 5,787,348 | 7/1998 | Willey et al. | 455/441 |
| 5,805,581 | 9/1998 | Uchida et al. | 370/337 |
| 5,911,122 | 6/1999 | Corriveau et al. | 455/432 |
| 5,930,714 | 7/1999 | Abu-Amara et al. | 455/442 |
| 5,953,661 | 9/1999 | Scwinghammer et al. | 455/423 |
| 6,035,197 | 3/2000 | Haberman et al. . | |

FOREIGN PATENT DOCUMENTS 2286094  8/1995  United Kingdom .

OTHER PUBLICATIONS

Mouly, et al., "The GSM System for Mobile Communications", pp. 547–552 (1993).

Chang, et al. "Architecture Alternative for Wireless Data Services: Interworking with Voiceband Modem", IEEE Networks for Personal Communications, Mar. 1994, pp. 1–8.

PCT International Search Report, Nov. 3, 1997, File No. PCT SE 97/01490.

*Primary Examiner*—William Cumming
*Attorney, Agent, or Firm*—Jenkens & Gilchrist

[57] ABSTRACT

In those instances wherein inter-exchange handoff of a cellular call occurs, and a mobile station desires to activate an in-call service change with respect to that cellular call among and between a plurality of supported voice and data services, a change of service request message is initiated by a serving mobile switching center and transmitted to an anchor mobile switching center. The request is processed by each switching node to confirm availability of the necessary facilities to support the requested service (on either the existing call circuit or a new call circuit). Once confirmed, the anchor mobile switching center initiates a change of service request reply for transmission back to the serving mobile switching center. These messages could be relayed through one or more intermediate tandem mobile switching centers if necessary. Reconfiguration of the facilities is also performed to support the requested service change.

25 Claims, 7 Drawing Sheets

FIG.4

INTER-EXCHANGE SIGNALING FOR IN-CALL SERVICE CHANGE REQUESTS

BACKGROUND OF THE INVENTION

1. Technical Field of the Invention

The present invention relates to cellular telephone networks and, in particular, to the handling of in-call service change requests.

2. Description of Related Art

The radio connection between a mobile station and the cellular telephone network, as well as the connections within the cellular telephone network itself, support both data communications and voice communications by subscribers. In particular, the connections support the use of a number of different types of data communications services and a number of different types of voice communications services. For example, on the data communications side both asynchronous data communication and Group 3 (G3) facsimile services may be supported. Furthermore, again for example, on the voice communications side both analog and digital speech services may be supported. A number of other types of voice and data communications services are known to those skilled in the art and are supported by the cellular telephone network.

It is not an uncommon occurrence for a cellular subscriber to need to make use of two or more of the various available communications services during the course of a single call connection. For example, the subscriber may be involved in a voice conversation with another party using one of the cellular network and mobile station supported voice services, and then need to send (or receive) a facsimile to (from) the other party. Many cellular telephone networks, such as the Personal Communications Services (PCS) network, digital Advanced Mobile Phone System (D-AMPS) network, and Global System for Mobile (GSM) Communications network, allow the subscriber to switch among and between a plurality of supported data and voice communications services without having to establish separate, and new, calls. This is accomplished through a known procedure referred to in the art as "in-call modification" or "in-call service change". By transmitting a certain signal over the radio connection to the currently serving switching node of the cellular network, a request for the service change is made. The serving switching node responds, again using a signaling transmission over the radio connection, with a reply granting or denying the service change. If the service change is granted, the serving switching node further takes the necessary steps to reconfigure the facilities of the cellular network (as and if required) to handle the newly requested and selected communications service.

The term "facilities" refers collectively to many types or classes of communications resources. For example, a switching node within a cellular telephone network uses both inter-switch and internal facilities. The inter-switch facilities comprise inter-switch circuits or trunks (both analog and digital) for handling call connections. The internal facilities comprise interworking functions (IWFs), trancoders for vocoding within the switch, radio related resources such as radio frequency channels (for communicating with mobile stations), and air interface bandwidth on a selected radio frequency channel. Responsive to a granted in-call service change request, it may become necessary for a switching node to modify existing facilities or allocate new facilities within the cellular telephone network to support the service change.

Consider now the situation where the subscriber has established a cellular call connection, and moves through the service area forcing an inter-exchange handoff of the call connection from a cell assigned to one switching node (the anchor switch) to a cell assigned to another switching node (the target switch, and then the serving switch after handoff). This handoff does not affect the continuation of the cellular call connection. It does, however, affect the ability of the cellular network to provide service changes and respond to in-call service change requests. This is because it is the anchor switching node which continues to exercise control over the cellular call connection, but it is the serving switching node which has received the service change request from the subscriber. There is a need for a system and method for insuring that service change requests, especially following instances of inter-exchange handoff, are routed through the cellular telephone network as needed to the proper switching node for handling and response.

SUMMARY OF THE INVENTION

Messages are transmitted between mobile switching centers of a cellular telephone network, in those instances wherein inter-exchange handoff of a mobile subscriber cellular call connection has commenced, to control the activation of an in-call service change with respect to that cellular call connection among and between a plurality of supported voice and data services. These messages could be relayed through one or more intermediate tandem mobile switching centers if necessary. The messages comprise a change of service request initiated by the serving mobile switching center in response to a mobile station request for an in-call service change, and a change of service request reply initiated by the anchor mobile switching center to either allow or deny the mobile station requested in-call service change. Each mobile switching center through which the cellular call connection is routed processes the change of service request to determine whether the necessary facilities (either inter-switch or internal switch) are currently available or can be allocated to support the requested voice or data service. Reconfiguration of network facilities is then accomplished to support the requested service change. When the necessary facilities are not available and/or cannot be allocated, the request is denied.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
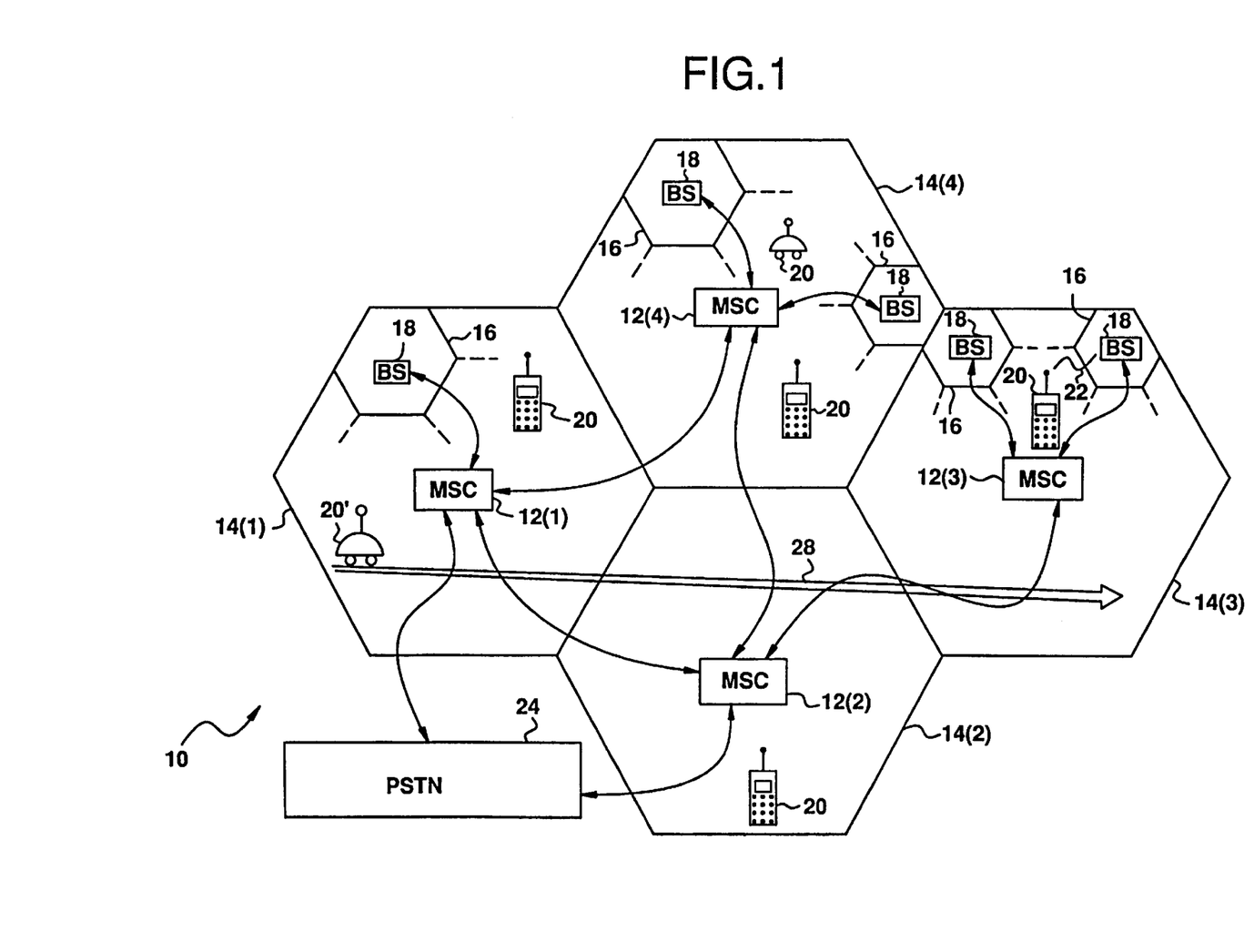
FIG. 1 is a block diagram of a cellular telephone system.

Reference is now made to FIG. 1 wherein there is shown a block diagram of a cellular telephone network 10 providing cellular telephone service throughout a geographic area. The cellular telephone network 10 comprises a plurality of interconnected mobile switching centers (MSC) 12 each controlling the provision of cellular telephone service in one particular service area 14 within the geographic area. Each service area 14 includes a plurality of cells 16 (only a few shown for simplification of the illustration), wherein each cell includes at least one base station (BS) 18 for effectuating radio frequency communications with proximately located mobile stations (MS) 20 over an air interface 22. The base stations 18 are connected for communications with the mobile switching center 12 for the service area 14 within which the cells 16 for those base stations are located. At least one mobile switching center 12 is connected for communications to the public switched telephone network (PSTN) 24. The cellular telephone network 10 may comprise a Global System for Mobile (GSM) communications, a digital Advanced Mobile Phone System (D-AMPS), a code division multiple access (CDMA) system, a Personal Communications Services (PCS) network, or the like. The general operation of the cellular telephone network 10 like that shown in FIG. 1 to support mobile station 20 voice and data communications services is well known to those skilled in the art, and will not be described in detail herein.

A number of different types of data and voice communications services (including, for example, asynchronous data communication services, G3 facsimile communications services, analog speech communications services and digital speech communications services) are supported by the network 10. It is further known to have the network 10, and in particular the serving mobile switching center 12, respond to mobile station 20 requests to switch among and between a plurality of supported data and voice communications services without having to establish a separate and perhaps new call connection. This is accomplished through a procedure referred to as "in-call modification" or "in-call service change" wherein a request signal is sent by the mobile station 20 over the air interface 22 to the currently serving mobile switching center 12. The serving switching node 12 processes the request and responds, again with a signal transmitted over the air interface 22, with a reply granting or denying the requested service change. If the service change is granted, the serving mobile switching center 12 further takes the necessary steps to reconfigure the facilities of the cellular network 10 (as and if required) to handle the newly requested and selected communications service.

Consider now the situation where a mobile station 20' is engaged in a cellular call using a first type communications service while located in service area 14(1). This call is routed through the mobile switching center 12(1) (referred to as "the anchor MSC") and, possibly, through the public switched telephone network 24. Assume now that the mobile station 20' begins to roam, perhaps along the path generally indicated by arrow 28, between the service areas 14, and in fact moves from service area 14(1) through service area 14(2) and into service area 14(3) without terminating that existing call connection. As the mobile station roams, the system 10 allocates the necessary inter-switch and internal switch facilities, and hands off responsibility for that call first to the mobile switching center 12(2) as the serving MSC, and then to the mobile switching center 12(3) as the serving MSC (with the mobile switching center 12(2) then becoming a tandem MSC). All the while, however, the anchor mobile switching center 12(1) remains in the call connection with the call communications being routed between the anchor MSC and the serving mobile switching center 12(3) through the tandem mobile switching center 12(2). Alternatively, if path minimization is implemented, the mobile switching center 12(2) is released, appropriate inter-switch facilities are allocated, and the call connection is routed directly between the serving mobile switching center 12(3) and the anchor mobile switching center 12(1).

At this point while traveling along arrow 28, the subscriber owning the mobile station 20' encounters a need to change communications services (for example, from one of the supported voice services to one of the supported data services) but does not want to hang up and initiate a new call connection. An in-call service change request signal is then generated and sent by the mobile station 20' over the air interface 22 to the currently serving mobile switching center 12(3). The anchor mobile switching center 12(1), however, maintains control over the call in instances of inter-exchange handoff. In accordance with the present invention, and responsive to the mobile station 20' request, the serving mobile switching center 12(3) generates a service change request invoke message, and transmits that message to the anchor mobile switching center 12(1) (via the tandem mobile switching center 12(2) if necessary). The anchor mobile switching center 12(1) then processes the invoke message and replies to the serving mobile switching center 12(3) with a service change request return result message either granting or denying the request. If the service change is granted, the anchor mobile switching center 12(1), tandem mobile switching center 12(2) (if necessary), and serving mobile switching center 12(3) further take the necessary steps to reconfigure the facilities (inter-switch or internal switch) of the cellular network 10 (as and if required) to handle the newly requested and selected communications service. This reconfiguration of facilities may involve either or both the modification of existing facilities with respect to the existing call connection, and/or the allocation of new facilities.

Reference is now made to FIGS. 2A–2D, 3 and 4 wherein there are shown nodal operation and signal flow diagrams illustrating processes for handling in-call service change requests in instances of inter-exchange mobile station roaming within the system of FIG. 1. With respect to each of these diagrams, it is assumed that the mobile station 20' is currently located within service area 14(3) and is being serviced by mobile switching center 12(3). It is further assumed that by way of inter-exchange handoff the tandem mobile switching center 12(2) remains involved in the existing call connection, and that anchor mobile switching center 12(1) controls the existing call connection. It will, however, be understood that the presence of a tandem mobile switching center 12(2) in the existing call connection is not a requirement for proper system operation in accordance with the present invention. In fact, for systems implementing path minimization the mobile switching center 12(2) is released and the existing call connection is routed directly between the serving mobile switching center 12(3) and the anchor mobile switching center 12(1). The presence of the tandem mobile switching center 12(2) in the call connection is thus to be taken as an illustration of, but not a limitation on, the operation of the present invention.

Figure 2A:
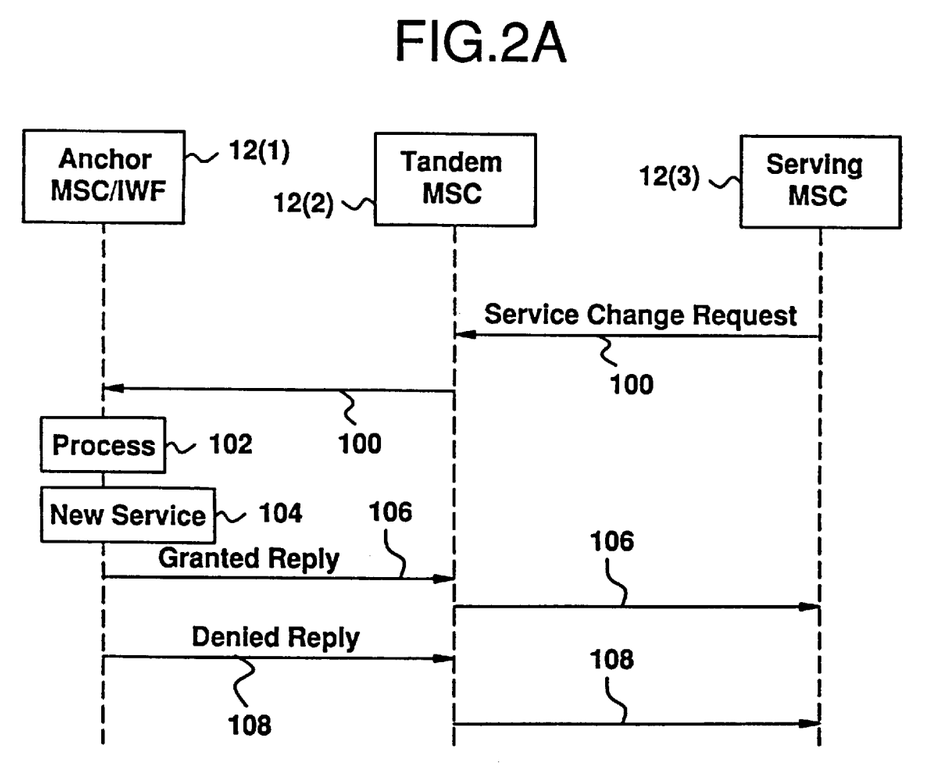
FIGS. 2A–2D, 3 and 4 are nodal operation and signal flow diagrams illustrating processes for handling in-call service change requests in instances of inter-exchange mobile station roaming within the system of FIG. 1.

With specific reference now to FIG. 2A, there is shown a nodal operation and signal flow diagram illustrating in general a first embodiment of the process for handling an in-call service change request. Responsive to serving mobile switching center 12(3) receipt of an in-call service change request (not shown) from a mobile station engaged in an existing inter-exchange handoff call connection, a service change request invoke message 100 is generated by the serving mobile switching center and transmitted towards the anchor mobile switching center 12(1). The request from the mobile station is a reverse digital traffic channel message transmitted to the serving mobile switching center 12(3) and may, alternatively, comprise a special service code. The serving mobile switching center 12(3) indicates in the invoke message 100 the necessary facilities to be used by the network for the service change. Those facilities are reflected in the parameters associated with the invoke message 100. As an example of the parameters that may be provided, reference is made to Table 1 giving the parameter name (first column), meaning (second column), and whether the parameter is optional (O) or required (R) for the invoke message 100 (third column).

TABLE 1

| | | |
|---|---|---|
| ISLPInfoFwd | Indicates the requested ISLP information for the connection to the IWF | O |
| CDMA Requested Service Configuration [ServiceConfiguration Record] | Indicates requested service configuration: Indicates the requested service configuration | R R |
| TDMACallModeInfo: | Identifies the Subscriber's requested Call Mode: | R |
| [ServiceCode] | Indicates the requested service (Analog Speech, Digital Speech, Analog or Digital Speech . . . Asynch Data, G3Fax) | R |
| [Bandwidth] | Indicates the requested channel bandwidth (TDMA half rate, TDMA full rate, TDMA double full rate etc . . . ) for the Data call | R |
| TDMAData Mode: | Indicates the data mode attributes for the requested ADS | O |
| [PM] | Identifies the requested privacy mode for the ADS. | |
| [SAP] | Identifies the SAP for the requested ADS. | |
| [Acked Data] | Identifies the CRC length for the requested ADS. | |
| [CRC] | Identifies the CRC length for the requested ADS. | |
| [Data Part] | Identifies the data protocol for the requested ADS | |
| [RLP] | Identifies the RLP for the requested ADS | |
| TDMA Voice Mode: | Identifies the requested Voice Mode | O |
| [VC] | Identifies requested voice coder | |
| [PM] | Indicates the requested privacy mode for voice | |
| MIN | Mobile Identification Number | R |
| ESN | Electronic Serial Number | R |
| IMSCCID | Inter-switch circuit ID | R |
| NewFac | Identifies whether and what new inter-switch facilities need to be allocated | R |

In this configuration, the CDMA Requested Service Configuration parameters and the TDMA Call Mode and Data Mode parameters are mutually exclusive. Also, in this configuration, the TDMA Data Mode and TDMA Voice Mode parameters are mutually exclusive. The foregoing identification of parameters is not meant to be exhaustive. Other parameters may be needed to implement the invoke message 100.

The service change request invoke message 100 is routed via the tandem mobile switching center 12(2) to the anchor mobile switching center 12 (1). The tandem mobile switching center 12(1) also indicates in the forwarded invoke message 100 the necessary facilities to be used by the network for the service change. Upon receipt by the anchor mobile switching center 12(1) of the forwarded invoke message 100, the request is processed (action 102) to either grant or deny the in-call service change. If granted, and no new inter-switch facilities are required, a new service using the existing inter-exchange call connection path is established (action 104) in accordance with the received parameters contained within the invoke message 100. A granted service change request return result message 106 is then generated by the anchor mobile switching center 12 (1) and transmitted towards the serving mobile switching center 12(3). The anchor mobile switching center 12(1) indicates in the return result message 106 the new call parameters associated with the service change. As an example of the parameters that may be provided, reference is made to Table 2 giving the parameter name (first column), meaning (second column), and whether the parameter is optional (O) or required (R) for the invoke message 100 (third column).

TABLE 2

| | | |
|---|---|---|
| ISLPInfoBwd | Indicates the granted ISLP information for the connection to the IWF | O |
| CDMA GrantedService Configuration: [ServiceConfigurationRecord] | Indicates granted service configuration Indicates the granted service configuration | R R |
| TDMAResult: | Identifies the Subscriber's granted service: | R |
| [ServiceCode] | Indicates the allocated service. | R |
| NewFac | Identifies whether and what new inter-switch facilities need to be allocated | O |

The return result message 106 is then routed via the tandem mobile switching center 12(2) to the serving mobile switching center 12(3).

Following receipt and processing (action 102) of the forwarded invoke message 100 by the anchor mobile switching center 12(1), the requested in-call service change may be denied. Such a denial typically occurs because the network resources (facilities) required for the requested service change cannot be allocated. A denied service change request return result message 108 is then generated by the anchor mobile switching center 12(1) and transmitted towards the serving mobile switching center 12(3). The anchor mobile switching center 12(1) indicates in the return result message 108 the resulting call parameters. An example of these parameters is provided in Table 3 giving name (first column), meaning (second column), and whether the parameter is optional (O) or required (R) for the invoke message 100 (third column).

TABLE 3

| | | |
|---|---|---|
| CDMAServiceDenied Reason: | Lists the reasons for rejection | R |
| TDMAResult: | Identifies the Subscriber's granted service: | O |
| [ServiceCode] | Indicates if the service is denied/rejected. | O |
| [Reason] | Lists the reasons for rejection | O |

The return result message 108 is then routed via the tandem mobile switching center 12(2) to the serving mobile switching center 12(3).

Figure 2B:
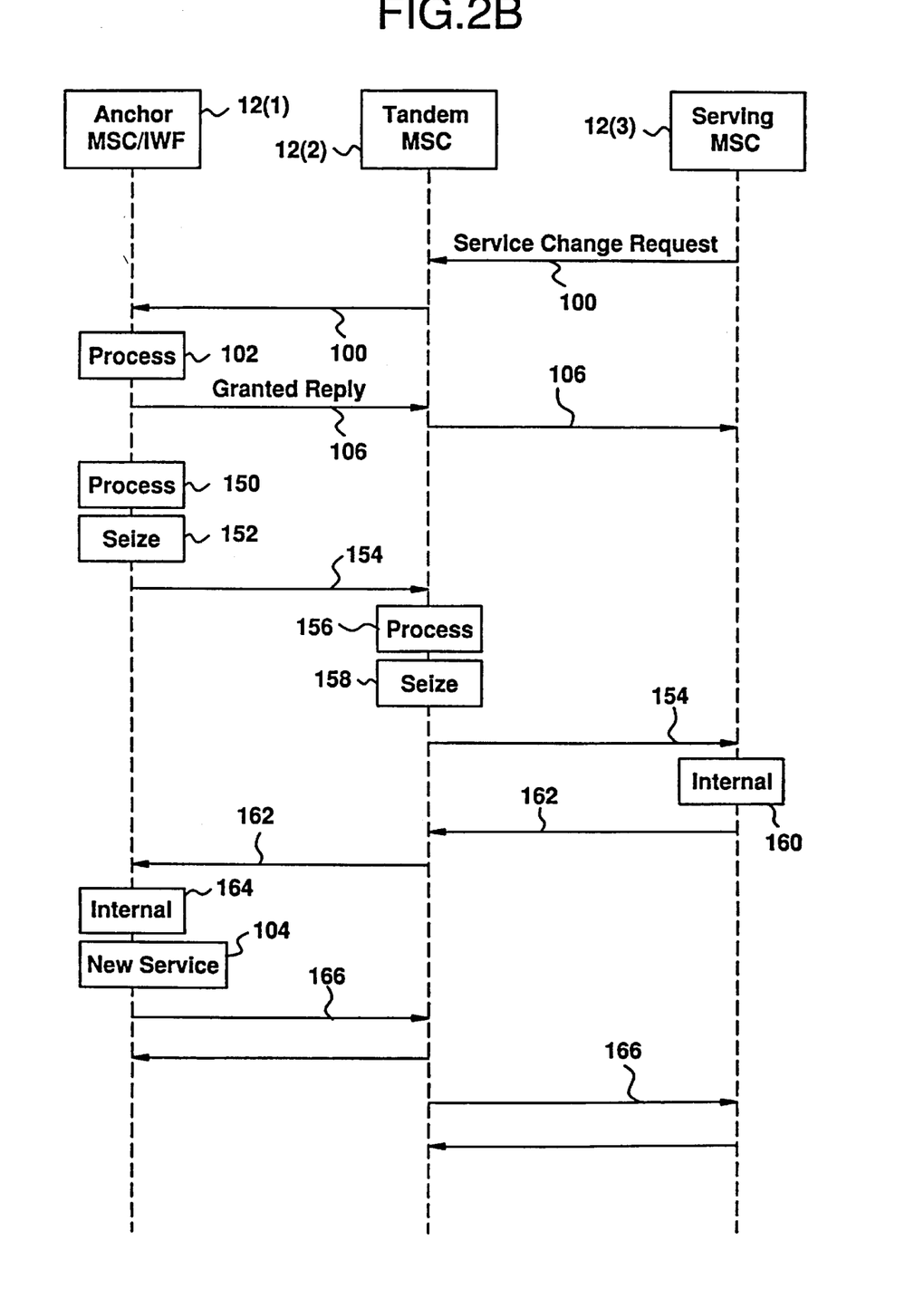

Reference is now made to FIG. 2B wherein there is shown a nodal operation and signal flow diagram illustrating in general a second embodiment for the process for handling an in-call service change request. Responsive to serving mobile switching center 12(3) receipt of an in-call service change request (not shown) from a mobile station engaged in an existing inter-exchange handoff call connection, a service change request invoke message 100 is generated by the serving mobile switching center and transmitted towards the anchor mobile switching center 12(1). The serving mobile switching center 12(3) indicates in the invoke message 100 the necessary facilities to be used by the network for the service change. The service change request invoke message 100 is routed via the tandem mobile switching center 12(2) to the anchor mobile switching center 12(1). The tandem mobile switching center 12(1) also indicates in the forwarded invoke message 100 the necessary facilities to be used by the network for the service change.

Upon receipt by the anchor mobile switching center 12(1) of the forwarded invoke message 100, the request is processed (action 102) to either grant or deny the in-call service change. If granted, a granted service change request return result message 106 is then generated by the anchor mobile switching center 12(1) and transmitted towards the serving mobile switching center 12(3). The anchor mobile switching center 12(1) indicates in the return result message 106 the new call parameters associated with the service change (see, Table 2). The new call parameters are processed (action 150) by the anchor mobile switching center 12(1) to identify whether the necessary facilities for the requested service indicated in the message include new inter-switch facilities (i.e., certain inter-switch facilities not currently being used to handle the existing inter-exchange call path). If new inter-switch facilities are needed between the anchor mobile switching center 12(1) and the tandem mobile switching center 12(2), these facilities are seized and connected (action 152). The anchor mobile switching center 12(1) then generates a new facilities invoke message 154 for transmission to the tandem mobile switching center 12(2). The anchor mobile switching center 12(1) indicates in the message 154 the parameters associated with the service change. These parameters include a result parameter identifying: the new inter-switch facilities required and successfully connected on this segment; the inter-switch facilities required and not successfully connected (i.e., trunk unavailable) on this segment; if no new facilities are required on this segment; identifying unsuccessful inter-switch facility connection on prior segments. These parameters further include granted service information associated with the return result message 106.

Upon receipt of the message 154, the tandem mobile switching center 12(2) processes (action 156) the message, to determine whether new inter-switch facilities are needed. If new inter-switch facilities are needed between the tandem mobile switching center 12(2) and the serving mobile switching center 12(3), these facilities are seized and connected (action 158). The tandem mobile switching center 12(1) then appropriately modifies the parameters of the new facilities invoke message 154 for transmission to the serving mobile switching center 12(3).

Responsive to the new facilities invoke message 154, the serving mobile switching center 12(3) allocates and configures the internal facilities needed to operate the new service (action 160). Provided that all required inter-switch facilities have been allocated on the involved segments, an in-call service change request reply (not shown) is then sent by the serving mobile switching center 12(3) to the mobile station. The serving mobile switching center 12(3) further generates a new facilities return result message 162 for transmission to the anchor mobile switching center 12(1) via the tandem mobile switching center 12(2), thus looping back the result parameters. The anchor mobile switching center 12(1) then reconfigures its internal facilities (action 154) to support operation of the new service which is then established (action 104) in accordance with the received parameters contained within the invoke message 100. Responsive to receipt of the new facilities return result message 162, the anchor mobile switching center 12(1) and the tandem mobile switching center 12(2) further generate and transmit a facilities release invoke message 166 (and receive a corresponding return result message) to de-allocate the inter-switch facilities previously established and used in connection with the prior service.

Figure 2C:
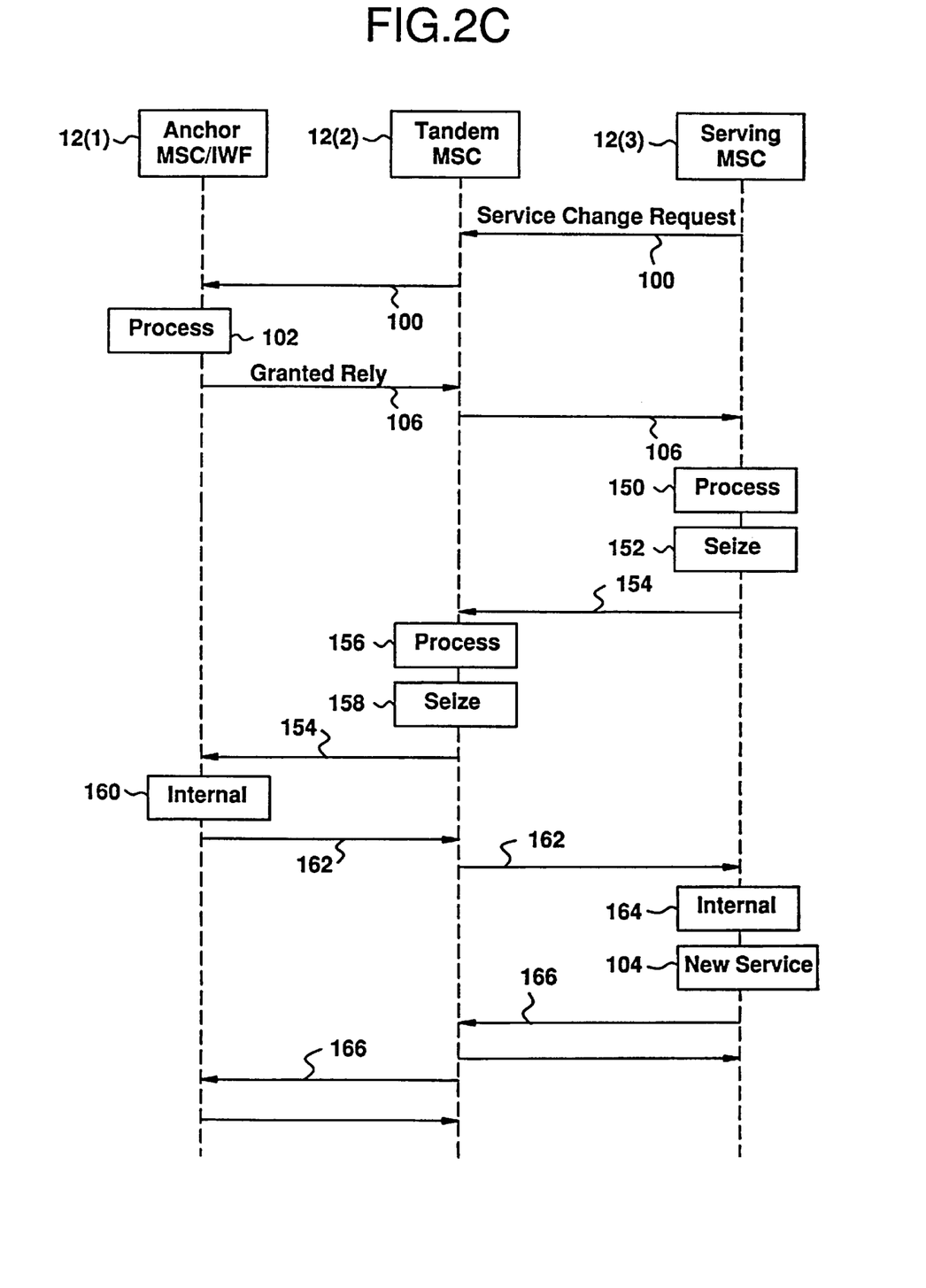

Reference is now made to FIG. 2C wherein there is shown a nodal operation and signal flow diagram illustrating in general a third embodiment for the process for handling an in-call service change request. Responsive to serving mobile switching center 12(3) receipt of an in-call service change request (not shown) from a mobile station engaged in an existing inter-exchange handoff call connection, the request is processed (action 102) to either grant or deny the in-call service change. If granted, a granted service change request return result message 106 is then generated by the anchor mobile switching center 12(1) and transmitted towards the serving mobile switching center 12(3). The anchor mobile switching center 12(1) indicates in the return result message 106 the new call parameters associated with the service change (see, Table 2).

Responsive to the receipt of the message 106, the new call parameters are processed (action 150) by the serving mobile switching center 12(3) to identify whether the necessary facilities for the requested service indicated in the message include new inter-switch facilities (i.e., certain inter-switch facilities not currently being used to handle the existing inter-exchange call path). If new inter-switch facilities are needed between the serving mobile switching center 12(3) and the tandem mobile switching center 12(2), these facilities are seized and connected (action 152). The serving mobile switching center 12(3) then generates a new facilities invoke message 154 for transmission to the tandem mobile switching center 12(2). The serving mobile switching center 12(3) indicates in the message 154 the parameters associated with the service change. These parameters include a result parameter identifying: the new inter-switch facilities required and successfully connected on this segment; the inter-switch facilities required and not successfully connected (i.e., trunk unavailable) on this segment; if no new facilities are required on this segment; identifying unsuccessful inter-switch facility connection on prior segments. These parameters further include granted service information associated with the return result message 106.

Upon receipt of the message 154, the tandem mobile switching center 12(2) processes (action 156) the message to determine whether new inter-switch facilities are needed. If new inter-switch facilities are needed between the tandem mobile switching center 12(2) and the anchor mobile switching center 12(1), these facilities are seized and connected (action 158). The tandem mobile switching center 12(1) then appropriately modifies the parameters of the new facilities invoke message 154 for transmission to the anchor mobile switching center 12(1).

Responsive to the new facilities invoke message 154, the anchor mobile switching center 12(1) allocates and configures the internal facilities needed to operate the new service (action 160). The anchor mobile switching center 12(1) further generates a new facilities return result message 162 for transmission to the serving mobile switching center 12(3) via the tandem mobile switching center 12(2), thus looping back the result parameters. Provided that all required inter-switch facilities have been allocated on the involved segments, an in-call service change request reply (not shown) is then sent by the serving mobile switching center 12(3) to the mobile station. The serving mobile switching center 12(3) then reconfigures its internal facilities (action 154) to support operation of the new service which is then established (action 104) in accordance with the received parameters contained within the invoke message 100. Responsive to receipt of the new facilities return result message 162, the serving mobile switching center 12(1) and the tandem mobile switching center 12(2) further generate and transmit a facilities release invoke message 166 (and receive a corresponding return result message) to de-allocate the inter-switch facilities previously established and used in connection with the prior service.

Figure 2D:
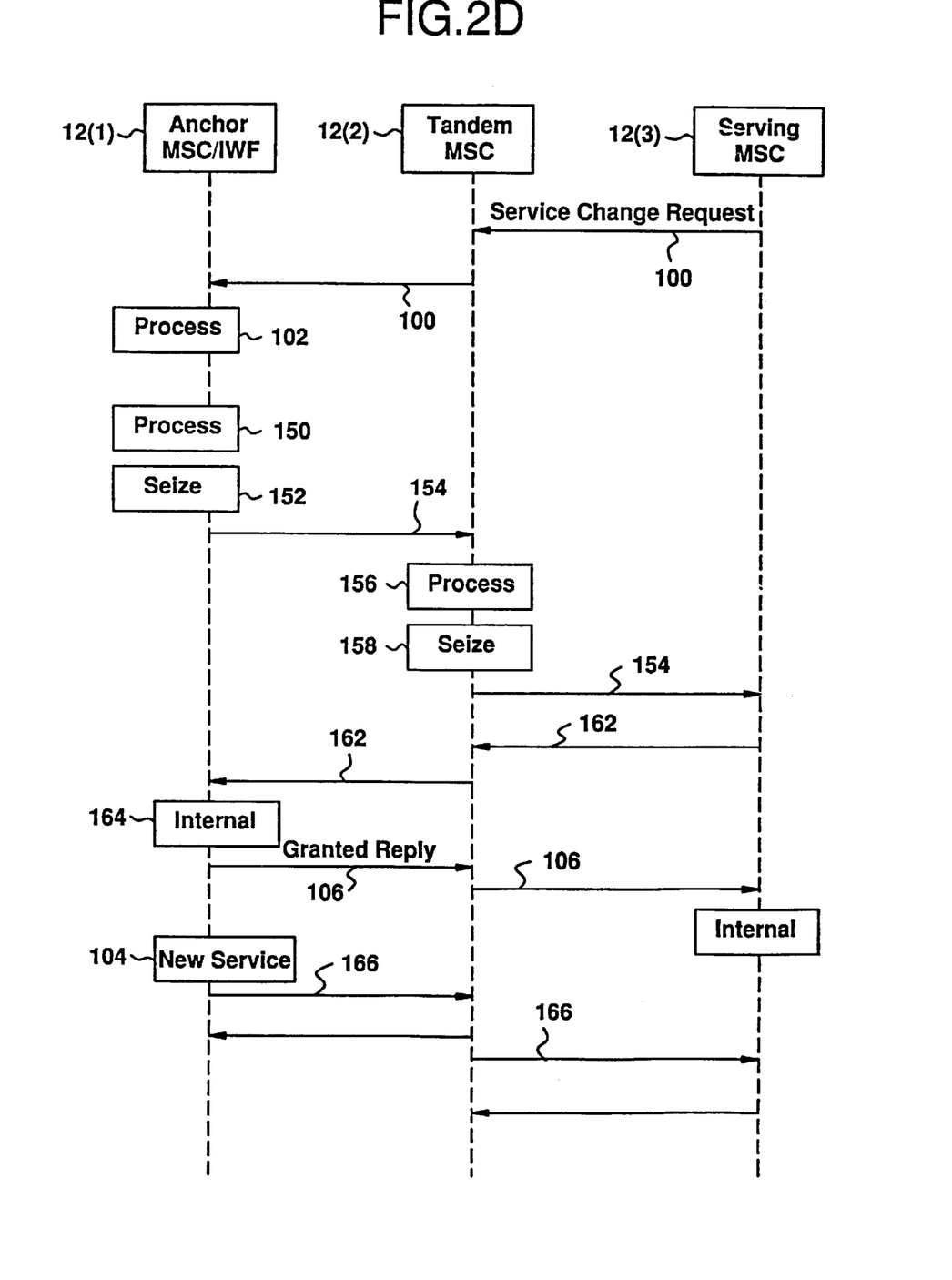

Reference is now made to FIG. 2D wherein there is shown a nodal operation and signal flow diagram illustrating in general a fourth embodiment for the process for handling an in-call service change request. Responsive to serving mobile switching center 12(3) receipt of an in-call service change request (not shown) from a mobile station engaged in an existing inter-exchange handoff call connection, a service change request invoke message 100 is generated by the serving mobile switching center and transmitted towards the anchor mobile switching center 12(1). The serving mobile switching center 12(3) indicates in the invoke message 100 the necessary facilities to be used by the network for the service change. The service change request invoke message 100 is routed via the tandem mobile switching center 12(2) to the anchor mobile switching center 12(1). The tandem mobile switching center 12(1) also indicates in the forwarded invoke message 100 the necessary facilities to be used by the network for the service change.

Upon receipt by the anchor mobile switching center 12(1) of the forwarded invoke message 100, the request is processed (action 102) to identify whether the necessary facilities for the requested service indicated in the message include new inter-switch facilities (i.e., certain inter-switch facilities not currently being used to handle the existing inter-exchange call path). If new inter-switch facilities are needed between the anchor mobile switching center 12(1) and the tandem mobile switching center 12(2), these facilities are seized and connected (action 152). The anchor mobile switching center 12(1) then generates a new facilities invoke message 154 for transmission to the tandem mobile switching center 12(2). The anchor mobile switching center 12(1) indicates in the message 154 the parameters associated with the service change. These parameters include a result parameter identifying: the new inter-switch facilities required and successfully connected on this segment; the inter-switch facilities required and not successfully connected (i.e., trunk unavailable) on this segment; if no new facilities are required on this segment; identifying unsuccessful inter-switch facility connection on prior segments.

Upon receipt of the message 154, the tandem mobile switching center 12(2) processes (action 156) the message to determine whether new inter-switch facilities are needed. If new inter-switch facilities are needed between the tandem mobile switching center 12(2) and the serving mobile switching center 12(3), these facilities are seized and connected (action 158). The tandem mobile switching center 12(1) then appropriately modifies the parameters of the new facilities invoke message 154 for transmission to the serving mobile switching center 12(3).

Responsive to the new facilities invoke message 154, the serving mobile switching center 12(3) generates a new facilities return result message 162 for transmission to the anchor mobile switching center 12(1) via the tandem mobile switching center 12(2), thus looping back the result parameters. The anchor mobile switching center 12(1) then reconfigures its internal facilities (action 154) to support operation of the new service. Provided that all required inter-switch facilities have been allocated on the involved segments, a granted service change request return result message 106 is then generated by the anchor mobile switching center 12(1) and transmitted towards the serving mobile switching center 12(3). The serving mobile switching center 12(3) then allocates and configures the internal facilities needed to operate the new service (action 160). An in-call service change request reply (not shown) is then sent by the serving mobile switching center 12(3) to the mobile station, and the new service is then established (action 104) in accordance with the received parameters contained within the invoke message 100. The anchor mobile switching center 12(1) and the tandem mobile switching center 12(2) further generate and transmit a facilities release invoke message 166 (and receive a corresponding return result message) to de-allocate the inter-switch facilities previously established and used in connection with the prior service.

Figure 3:
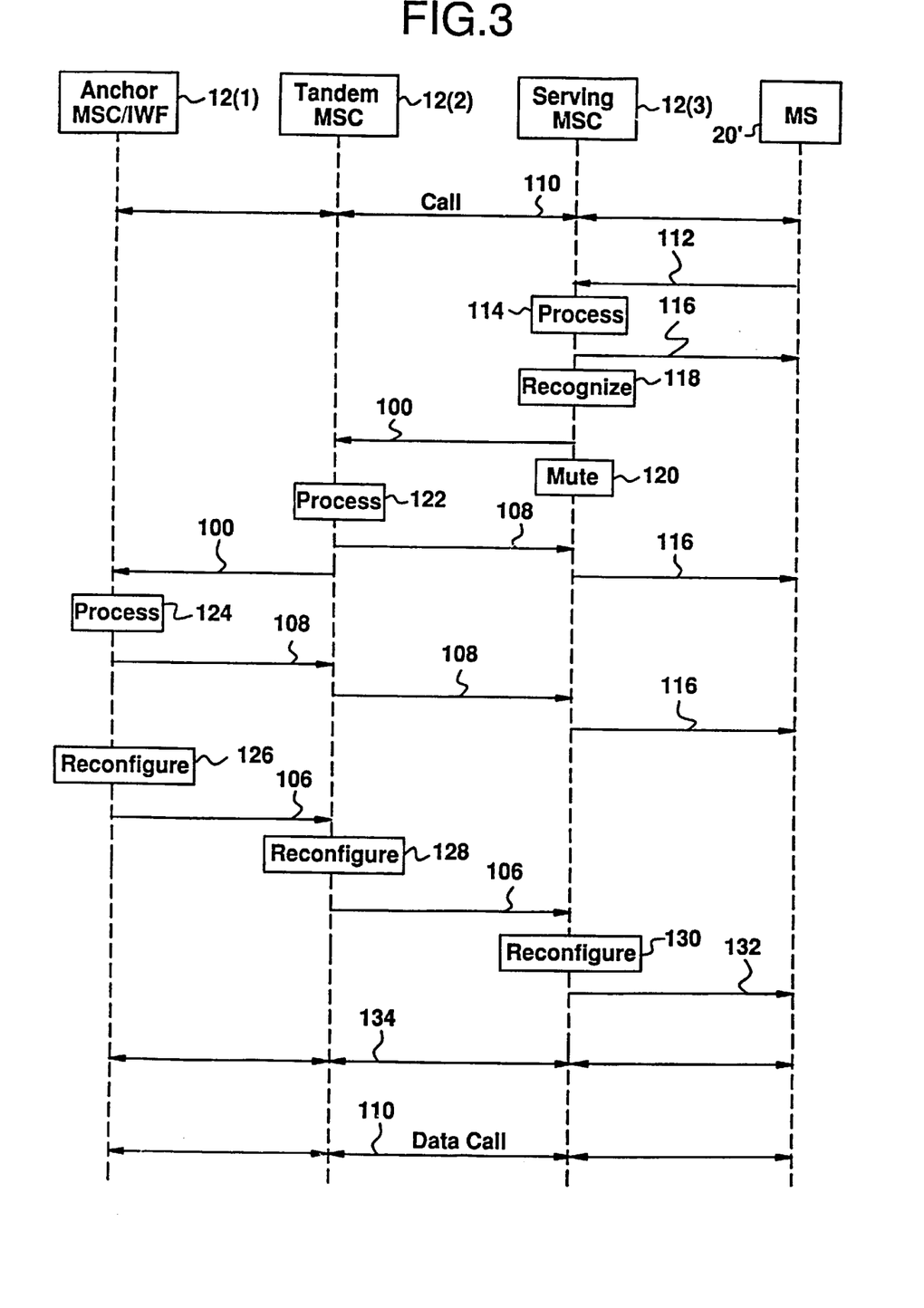

Reference is now made to FIG. 3 wherein there is shown a nodal operation and signal flow diagram illustrating a specific example of the process for handling an in-call service change request in accordance with the present invention. An inter-exchange handoff call connection 110 exists with a mobile station 20' using serving, tandem and anchor mobile switching centers 12(3), 12(2) and 12(1), respectively. This existing call connection 110 currently supports any selected one of a plurality of network supported voice or data services. The mobile station 20' then generates and transmits an in-call service change request 112 to the serving mobile switching center 12(3). This request 112 is a reverse digital traffic channel message transmitted to the serving mobile switching center 12(3) and may comprise a special service code, and further specifies the requested voice or data service change. In this particular example, the request 112 specifies a change from the existing voice or data service to an asynchronous data service. Accordingly, the included parameters of the request 112 specify the corresponding necessary facilities for the requested asynchronous data service.

The serving mobile switching center 12(3) processes (action 114) the request 112 to verify that it has available the necessary facilities to support the requested asynchronous data service. In this connection, it is noted that the verification involves a review of the currently utilized facilities as well as the allocation of new facilities (an in particular inter-switch facilities). If the requested service cannot be supported by the serving mobile switching center 12(3), a request denied message 116 is sent to the mobile station 20' and the current voice or data service provided over the existing inter-exchange handoff call connection 110 continues. For example, such a request would fail if the necessary vocoding capabilities or air interface resources are not available. If the requested service can be supported by the serving mobile switching center 12(3), the serving mobile switching center 12(3) recognizes (action 118) that it does not control the existing inter-exchange handoff call connection 110, and then generates a service change request invoke message 100 for transmission towards the controlling anchor mobile switching center 12(1). At this point, if the existing inter-exchange handoff call connection 110 comprises a voice service, the serving mobile switching center 12(3) may choose to mute the voice activity (vocoder operation) for the requesting mobile station 20' (action 120).

The service change request invoke message 100 is routed via the tandem mobile switching center 12(2) to the anchor mobile switching center 12 (1). The tandem mobile switching center 12(2) processes (action 122) the request invoke message 100 to verify that it has available the necessary facilities to support the requested asynchronous data service. Again, this decision involves an evaluation of both current facilities as well as new facilities. If the requested service cannot be supported by the tandem mobile switching center 12(2), a denied service change request return result message 108 is sent to the serving mobile switching center 12(3) and forwarded as request denied message 116 on to the mobile station 20'. For example, such a request would fail if the necessary digital trunks are not available. The current voice or data service provided over the existing inter-exchange handoff call connection 110 then continues. If the requested service can be supported by the tandem mobile switching center 12(2), the tandem mobile switching center 12(2) forwards the request invoke message 100 on to the anchor mobile switching center 12(1).

The anchor mobile switching center 12(1) then processes (action 124) the forwarded request invoke message 100 to verify that it has available the necessary facilities to support the requested asynchronous data service. Again, this decision involves an evaluation of both current facilities as well as new facilities. If the requested service cannot be supported by the anchor mobile switching center 12(1), a denied service change request return result message 108 is sent to the tandem mobile switching center 12(2) and forwarded on to serving mobile switching center 12(3) and then forwarded as request denied message 116 on to the mobile station 20'. For example, such a request would fail if the appropriate interworking functions needed to support the new service are not available. The current voice or data service provided over the existing inter-exchange handoff call connection 110 then continues. If the requested service can be supported by the anchor mobile switching center 12(1), the anchor mobile switching center 12(1) reconfigures (action 126) the facilities (current or new, internal and/or inter-switch) needed to support the requested asynchronous data service. Reconfiguration to provide new facilities is accomplished using the transactions previously described in connection with FIGS. 2B–2D. A granted service change request return result message 106 is then generated by the anchor mobile switching center 12(1) and transmitted towards the serving mobile switching center 12(3).

The granted service change request return result message 106 is routed via the tandem mobile switching center 12(2) to the serving mobile switching center 12(3). The tandem mobile switching center 12(2) receives this message and in response thereto reconfigures (action 128) the facilities (current or new inter-switch) needed to support the requested asynchronous data service. Reconfiguration to provide new facilities is accomplished using the transactions previously described in connection with FIGS. 2B–2D. Responsive to receipt of the forwarded granted service change request return result message 106, the serving mobile switching center 12(3) reconfigures (action 130) the facilities (current or new, internal and/or inter-switch) needed to support the requested asynchronous data service, and sends a request granted message 132 to the mobile station 20'. Reconfiguration to provide new facilities is accomplished using the transactions previously described in connection with FIGS. 2B–2D. An asynchronous data service handshake sequence negotiation 134 is then initiated between the mobile station 20' and the interworking function (not shown) of the anchor mobile switching center 12(1) resulting in the establishment of an asynchronous data communications connection over the existing inter-exchange handoff call connection 110.

Figure 4:
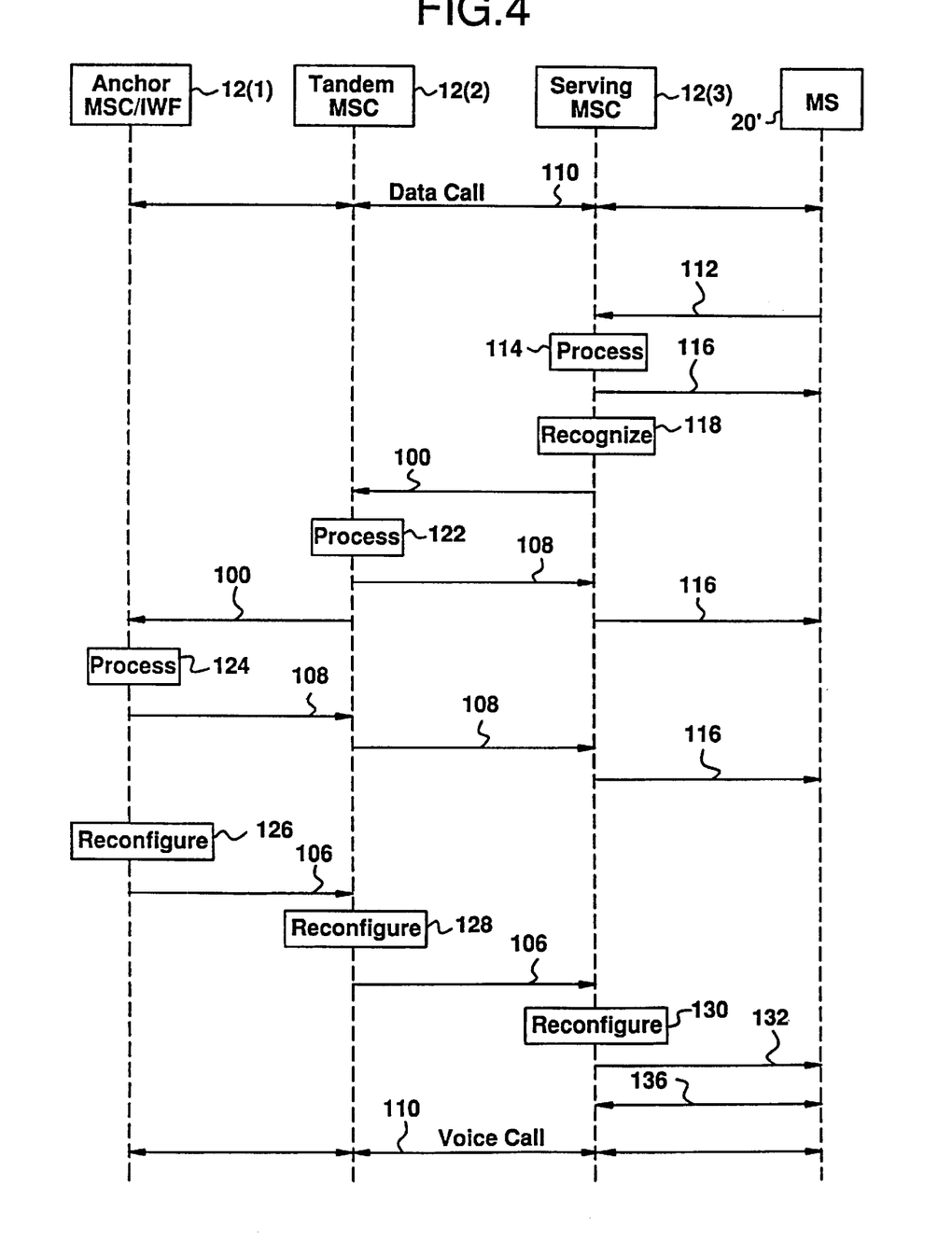

Reference is now made to FIG. 4 wherein there is shown a nodal operation and signal flow diagram illustrating another specific example of the process for handling an in-call service change request in accordance with the present invention. An inter-exchange handoff call connection 110 exists with a mobile station 20' using serving, tandem and anchor mobile switching centers 12(3), 12(2) and 12(1), respectively. This existing call connection 110 currently supports any selected one of a plurality of network supported data services. The mobile station 20' then generates and transmits an in-call service change request 112 to the serving mobile switching center 12(3). This request 112 is a reverse digital traffic channel message transmitted to the serving mobile switching center 12(3) or may comprise a special service code, and further specifies the requested voice or data service change. In this particular example, the request 112 specifies a change from the existing data service to a selected voice service. Accordingly, the included parameters of the request 112 specify the corresponding necessary facilities for the requested voice service.

The serving mobile switching center 12(3) processes (action 114) the request 112 to verify that it has available the necessary facilities to support the requested voice service. In this connection, it is noted that the verification involves a review of the currently utilized facilities as well as the allocation of new facilities (and in particular inter-switch facilities). If the requested service cannot be supported by the serving mobile switching center 12(3), a request denied message 116 is sent to the mobile station 20' and the current data service provided over the existing inter-exchange handoff call connection 110 continues. If the requested service can be supported by the serving mobile switching center 12(3), the serving mobile switching center 12(3) recognizes (action 118) that it does not control the existing inter-exchange handoff call connection 110, and then generates a service change request invoke message 100 for transmission towards the controlling anchor mobile switching center 12(1).

The service change request invoke message 100 is routed via the tandem mobile switching center 12(2) to the anchor mobile switching center 12(1). The tandem mobile switching center 12(2) processes (action 122) the request invoke message 100 to verify that it has available the necessary facilities to support the requested voice service. Again, this decision involves an evaluation of both current facilities as well as new facilities. If the requested service cannot be supported by the tandem mobile switching center 12(2), a denied service change request return result message 108 is sent to the serving mobile switching center 12(3) and forwarded as request denied message 116 on to the mobile station 20'. The current data service provided over the existing inter-exchange handoff call connection 110 then continues. If the requested service can be supported by the tandem mobile switching center 12(2), the tandem mobile switching center 12(2) forwards the request invoke message 100 on to the anchor mobile switching center 12(1).

The anchor mobile switching center 12(1) then processes (action 124) the forwarded request invoke message 100 to verify that it has available the necessary facilities to support the requested asynchronous voice service. Again, this decision involves an evaluation of current facilities as well as new facilities. If the requested service cannot be supported by the anchor mobile switching center 12(1), a denied service change request return result message 108 is sent to the tandem mobile switching center 12(2) and forwarded on to serving mobile switching center 12(3) and there forwarded as request denied message 116 on to the mobile station 20'. The current data service provided over the existing inter-exchange handoff call connection 110 then continues. If the requested service can be supported by the anchor mobile switching center 12(1), the anchor mobile switching center 12(1) reconfigures (action 126) the facilities (current or new, internal and/or inter-switch) needed to support the requested voice service. Reconfiguration to provide new facilities is accomplished using the transactions previously described in connection with FIGS. 2B–2D. A granted service change request return result message 106 is then generated by the anchor mobile switching center 12(1) and transmitted towards the serving mobile switching center 12(3).

The granted service change request return result message 106 is routed via the tandem mobile switching center 12(2) to the serving mobile switching center 12(3). The tandem mobile switching center 12(2) receives this message and in response thereto reconfigures (action 128) the facilities (current or new inter-switch) needed to support the requested voice service. Reconfiguration to provide new facilities is accomplished using the transactions previously described in connection with FIGS. 2B–2D. Responsive to receipt of the forwarded granted service change request return result message 106, the serving mobile switching center 12(3) reconfigures (action 130) the facilities (current or new, internal and/or inter-switch) needed to support the requested voice service, and sends a request granted message 132 to the mobile station 20X. Reconfiguration to provide new facilities is accomplished using the transactions previously described in connection with FIGS. 2B–2D. Vocoder activity is then initiated 136 between the mobile station 20' and the serving mobile switching center 12(3) resulting in the establishment of a voice communications connection over the existing inter-exchange handoff call connection 110.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A cellular telephone system including a plurality of mobile switching centers, the mobile switching centers generating, following a completed inter-exchange handoff of an on-going cellular call and in response to a mobile station subscriber request for an in-call change in voice or data service type with respect to that on-going cellular call among and between a plurality of supported voice and data service types, a first message originated at a currently serving one of the mobile switching centers and transmitted toward an anchor mobile switching center handling that on-going cellular call requesting implementation of a change in the voice or data service type, and a second message responsive to the first message originated at the anchor mobile switching center and transmitted toward the currently serving mobile switching center granting or denying the voice or data service type change request.

2. The system of claim 1 wherein the plurality of supported data services include Group 3 (G3) facsimile services.

3. The system of claim 1 wherein the plurality of supported data services include asynchronous data services.

4. The system of claim 1 wherein each mobile switching center through which the on-going existing inter-exchange handoff cellular call is routed verifies that it has facilities available for supporting the requested service over the on-going inter-exchange handoff cellular call.

5. The system as in claim 4 wherein the facilities comprise inter-mobile switching center trunk facilities and internal mobile switching center communications facilities.

6. The system as in claim 5 wherein verification of available facilities is made with respect to those facilities utilized on an existing call circuit handling the on-going inter-exchange handoff cellular call.

7. The system as in claim 5 wherein verification of available facilities is made with respect to those facilities utilized on a new call circuit to be used for handling the on-going inter-exchange handoff cellular call.

8. The system as in claim 7, the mobile switching centers further generating a third message requesting allocation of facilities with respect to the new call circuit to be used for handling the on-going inter-exchange handoff cellular call.

9. A method for cellular telephone network operation following completion of an inter-exchange handoff of an on-going cellular call and a mobile station subscriber request for an in-call change in voice or data service type with respect to that on-going cellular call among and between a plurality of supported voice and data service types, comprising the steps of:

generating at a mobile switching center currently serving a mobile station and in response to the mobile station subscriber request a first message requesting the mobile station specified voice or data service type change;

transmitting the first message from the currently serving mobile switching center to an anchor mobile switching center with respect to the on-going inter-exchange handoff cellular call;

processing of the first message request by the anchor mobile switching center to determine if necessary facilities supporting the requested voice or data service type change can be allocated;

generating at the anchor mobile switching center and in response to the processing determination a second message granting or denying the voice or data service type change based on the results of the facilities determination; and transmitting the second message from the anchor mobile switching center to the currently serving mobile switching center.

10. The method as in claim 9 further including the steps of:

routing the first message through at least one tandem mobile switching center through which the on-going inter-exchange handoff cellular call is routed; and processing of the first message request by each tandem mobile switching center to determine if necessary facilities supporting the request service can be allocated.

11. The method as in claim 9 further including the step of processing of the second message by the serving mobile switching center to signal the requesting mobile station as to the granting or denying of the in-call service change request.

12. The method as in claim 9 wherein the plurality of supported data services include Group 3 (G3) facsimile services.

13. The method as in claim 9 wherein the plurality of supported data services include asynchronous data services.

14. The method as in claim 9 wherein the facilities comprise inter-mobile switching center trunk facilities and internal mobile switching center communications facilities.

15. The method as in claim 14 wherein the step of processing to determine if necessary facilities can be allocated includes the step of making the determination respect to those facilities utilized on an existing call circuit handling the on-going inter-exchange handoff cellular call.

16. The method as in claim 14 wherein the step of processing to determine if necessary facilities can be allocated includes the step of making the determination respect to those facilities utilized on a new call circuit to be used for handling the on-going inter-exchange handoff cellular call.

17. The method as in claim 16 further including the step of generating at a mobile switching center a third message for transmission to another mobile switching center requesting allocation of facilities with respect to the new call circuit to be used for handling the on-going inter-exchange handoff cellular call.

18. A cellular telephone system, comprising:

a mobile switching center currently serving a mobile station following completion of an inter-exchange handoff of an on-going cellular call including means, responsive to a mobile station subscriber request for an in-call change in voice or data service type with respect to that on-going cellular call among and between a plurality of supported voice and data service types, for generating a first message requesting the voice or data service type change; and an anchor mobile switching center handling the on-going inter-exchange handoff cellular call and responding to the first message by determining if necessary facilities supporting the requested voice or data service type change can be allocated for the on-going inter-exchange handoff cellular call and transmitting a second message to the serving mobile switching center granting or denying the voice or data service type change request based on that facilities determination.

19. The system of claim 18 further including at least one tandem mobile switching center connected between the serving mobile switching center and the anchor mobile switching center, the first and second messages being routed through the at least one tandem mobile switching center, and each tandem mobile switching center further determining if necessary facilities supporting the requested service can be allocated for the on-going inter-exchange handoff cellular call.

20. The system of claim 18 wherein the plurality of supported data services include Group 3 (G3) facsimile services.

21. The system of claim 18 wherein the plurality of supported data services include asynchronous data services.

22. The system as in claim 18 wherein the facilities comprise inter-mobile switching center trunk facilities and internal mobile switching center communications facilities.

23. The system as in claim 22 wherein the determination of necessary facilities is made with respect to those facilities utilized on an existing call circuit handling the on-going inter-exchange handoff cellular call.

24. The system as in claim 22 wherein the determination of necessary facilities is made with respect to those facilities utilized on a new call circuit to be used for handling the on-going inter-exchange handoff cellular call.

25. The system as in claim 24 further including the mobile switching center transmitting a third message to another mobile switching center requesting allocation of facilities with respect to the new call circuit to be used for handling the on-going inter-exchange handoff cellular call.

* * * * *